United States Patent
Soh et al.

(10) Patent No.: US 9,443,170 B2
(45) Date of Patent: Sep. 13, 2016

(54) ELECTRONIC APPARATUS TO TRANSMIT DATA TO BE PRINTED TO IMAGE FORMING APPARATUS USING MESSAGE SERVER AND METHOD THEREOF

(75) Inventors: Jae-Young Soh, Hwaseong-si (KR); Jeong-Jin Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/616,684

(22) Filed: Sep. 14, 2012

(65) Prior Publication Data

US 2013/0077129 A1    Mar. 28, 2013

(30) Foreign Application Priority Data

Sep. 27, 2011  (KR) .................. 10-2011-0097831

(51) Int. Cl.
*G06K 15/02* (2006.01)
*H04N 1/00* (2006.01)
*G06F 3/12* (2006.01)

(52) U.S. Cl.
CPC ............... *G06K 15/02* (2013.01); *G06F 3/122* (2013.01); *G06F 3/1228* (2013.01); *G06F 3/1268* (2013.01); *G06F 3/1287* (2013.01); *G06F 3/1288* (2013.01); *H04N 1/00244* (2013.01); *G06F 3/1229* (2013.01)

(58) Field of Classification Search
CPC ...................................................... G06K 15/02
USPC ...... 358/1.15, 1.13, 1.14; 709/206, 203, 217
See application file for complete search history.

(56) References Cited

U.S. PATENT DOCUMENTS

| | | | |
|---|---|---|---|
| 8,913,276 B2* | 12/2014 | Yamazaki | 358/1.15 |
| 2003/0078965 A1* | 4/2003 | Cocotis | H04L 63/029 709/203 |
| 2005/0162685 A1 | 7/2005 | Heiles et al. | |
| 2006/0176504 A1* | 8/2006 | Burke | G06F 3/1206 358/1.15 |
| 2006/0265458 A1* | 11/2006 | Aldrich et al. | 709/206 |
| 2012/0300251 A1* | 11/2012 | St. Laurent et al. | 358/1.15 |
| 2015/0172505 A1* | 6/2015 | Park | H04N 1/32106 358/1.15 |

FOREIGN PATENT DOCUMENTS

KR   10-0594743   6/2006

* cited by examiner

*Primary Examiner* — Jacky X Zheng
(74) *Attorney, Agent, or Firm* — Staas & Halsey LLP

(57) ABSTRACT

An electronic apparatus is provided. The electronic apparatus includes a messenger unit through which an image forming apparatus having an account address is selected as a dialog partner, a user interface through which a file to be printed in the selected image forming apparatus is selected; and a controller which controls the messenger unit to transmit a dialog message including the selected file and account information of the image forming apparatus to the message server.

19 Claims, 16 Drawing Sheets

ELECTRONIC APPARATUS TO TRANSMIT DATA TO BE PRINTED TO IMAGE FORMING APPARATUS USING MESSAGE SERVER AND METHOD THEREOF

CROSS-REFERENCE TO RELATED APPLICATIONS

This application claims priority benefit from Korean Patent Application No. 10-2011-0097831, filed on Sep. 27, 2011, in the Korean Intellectual Property Office, the disclosure of which is incorporated herein by reference in its entirety.

BACKGROUND

1. Field

Methods and apparatuses consistent with embodiments relate to an electronic apparatus, a message server, and a method for controlling printing, and more particularly, to an electronic apparatus which transmits a file to be printed to a message server as a dialogue message and prints the file, a message server, and a method for controlling printing.

2. Description of the Related Art

An image forming apparatus generally refers to an apparatus that prints printing data, which is generated in a terminal apparatus such as a computer, on a recording medium. Examples of such an image forming apparatus are copiers, printers, facsimile machines, or multifunction peripherals (MFP), which complexly realizes the functions of the aforementioned devices in a single device.

As cloud computing is applied to a terminal apparatus such as a computer in recent years, a printing job may be performed in a server, in which information is stored, rather than in a terminal apparatus. Herein, the cloud computing refers to a computer environment in which information is stored in a server on the Internet and a terminal apparatus temporarily stores information.

However, even if such cloud computing is applied, users frequently store information individually in a transition period of the cloud computing, and users may also store private data individually even in cloud computing. The information may be a printing job or the printing information. Therefore, there is a demand for a method for printing information (file) stored in a terminal apparatus so that the users may easily perform a printing job in a cloud computing environment.

SUMMARY

Additional aspects and/or advantages will be set forth in part in the description which follows and, in part, will be apparent from the description, or may be learned by practice of the invention.

One or more embodiments may overcome the above disadvantages and other disadvantages not described above. However, it is understood that one or more embodiment are not required to overcome the disadvantages described above, and may not overcome any of the problems described above.

One or more embodiments provide an electronic apparatus which transmits a file to be printed to a message server as a dialogue message and prints the file, a message server, and a method for controlling printing.

According to an aspect of an embodiment, there is provided an electronic apparatus which is connectible to a message server which transmits a printing job to an image forming apparatus, the electronic apparatus including a messenger unit through which an image forming apparatus having an account address is selected as a dialogue partner, a user interface through which a file to be printed in the selected image forming apparatus is selected, and a controller which controls the messenger unit to transmit a dialogue message including the selected file and account information of the image forming apparatus to the message server.

The messenger unit may receive one or more dialogue partners corresponding to user account of the electronic apparatus from the message server, control the user interface to display the one or more received dialogue partners, and receive selection of an image forming apparatus having an account address as a dialogue partner from among the one or more displayed dialogue partners.

If the image forming apparatus is selected as a dialogue partner, the user interface may display a dialogue box for the image forming apparatus.

A user may select a file that is placed on the dialogue box in a drag-and-drop method as the file to be printed through the user interface.

The messenger unit may receive state information of the selected image forming apparatus as a dialogue message, and the user interface may display the received state information on the dialogue box.

The state information may be at least one of information on an operation state of the image forming apparatus and information on a printing option applicable in the image forming apparatus.

The user interface may receive a printing option to be applied to the file through the dialogue box, and the messenger unit may transmit a dialogue message including the input printing option to the message server.

The messenger unit may transmit and receive a dialogue message using an extensible messaging and presence protocol (XMPP).

The messenger unit may receive a dialogue message on a progress of printing of the transmitted file from the message server, and the user interface may display the dialogue message on the progress of printing on the dialogue box.

The messenger unit may transmit a dialogue message including account information of the electronic apparatus, account information of the image forming apparatus, and a message body to the message server.

According to an aspect of another embodiment, there is provided a message server which receives a dialogue message from an electronic apparatus, the message server including a message processor which receives a dialogue message including a file and an account address of an image forming apparatus from the electronic apparatus, an account management unit which searches an image forming apparatus to perform a printing job based on the account address included in the dialogue message, and a job management unit which transmits the file included in the dialogue message to the searched image forming apparatus.

The job management unit may obtain state information including at least one of information on an operation state of the image forming apparatus and information on a printing option applicable in the image forming apparatus, and the message processor may transmit a dialogue message including the obtained state information to the electronic apparatus.

The message processor may receive a dialogue message including information on a printing option to be applied to the file from the electronic apparatus, and the job management unit may convert the received printing option into a control command recognizable by the image forming apparatus, and may transmit the converted control command and the file to the image forming apparatus.

The job management unit may generate printing data by rendering the file included in the dialogue message and transmit the generated printing data to the image forming apparatus.

The message processor mat receive a dialogue message including a printing option to be applied to the file from the electronic apparatus, and the job management unit may generate printing data by rendering the file and by applying the received printing option.

The job management unit may check a progress of printing of the transmitted file, and the message processor may transmit a dialogue message including the checked progress of printing to the electronic apparatus.

The message processor may transmit and receive a dialogue message using an XMPP.

If information on a user account of the electronic apparatus is received, the account management unit may search a dialogue partner corresponding to the user account, and the message processor may transmit the searched dialogue partner to the electronic apparatus.

The message server may further include a storage unit which stores a physical address of the image forming apparatus, account information of the image forming apparatus, and information on a user who will use the image forming apparatus, and the account management unit may search a physical address of the image forming apparatus to perform the printing job based on the account address included in the dialogue message and the information stored in the storage unit.

The message server may further include a user interface through which at least one of a physical address of a new image forming apparatus, account information of the new image forming apparatus, and account information of a user who will use the new image forming apparatus is input, and the account management unit may add the new image forming apparatus as a dialogue partner for each user account.

According to an aspect of still another embodiment, there is provided a method for controlling printing of an electronic apparatus which is connectible to a message server which transmits a printing job to an image forming apparatus, the method including receiving selection of an image forming apparatus having an account address as a dialogue partner, receiving selection of a file to be printed by the selected image forming apparatus, and transmitting a dialogue message including the selected file and account information of the image forming apparatus to the message server.

The method may further include receiving a dialogue partner corresponding to a user account of the electronic apparatus from the message server, and displaying the received dialogue partner, and the receiving the selection of the dialogue partner may include receiving selection of an image forming apparatus having an account address as a dialogue partner from among the displayed dialogue partners.

The method may further include, if the image forming apparatus is selected as a dialogue partner, displaying a dialogue box for the selected image forming apparatus.

The receiving the selection of the file to be printed may include receiving selection of a file that is placed on the dialogue box in a drag-and-drop method as the file to be printed.

The method may further include receiving state information of the selected image forming apparatus as a dialogue message, and displaying the received state information on the dialogue box.

The state information may be at least one of information on an operation state of the image forming apparatus and information on a printing option applicable in the image forming apparatus.

The method may further include receiving a printing option to be applied to the file through the dialogue box, and transmitting a dialogue message including the received printing option to the message server.

The method may further include receiving a dialogue message on a progress of printing of the transmitted file from the message server, and displaying the dialogue message on the progress of printing on the dialogue box.

The transmitting the dialogue message to the message server may include transmitting the dialogue message using an XMPP.

The transmitting the dialogue message to the message server may include transmitting a dialogue message including account information of the electronic apparatus, account information of the image forming apparatus, and a message body to the message server.

According to an aspect of still another embodiment, there is provided a method for controlling printing of a message server which receives a dialogue message from an electronic apparatus, the method including receiving a dialogue message including a file and an account address of an image forming apparatus from the electronic apparatus, searching an image forming apparatus to perform a printing job based on the account address included in the dialogue message, and transmitting the file included in the dialogue message to the searched image forming apparatus.

The method may further include obtaining state information including at least one of information on an operation state of the image forming apparatus and information on a printing option applicable in the image forming apparatus, and transmitting a dialogue message including the obtained state information to the electronic apparatus.

The method may further include receiving a dialogue message including information on a printing option to be applied to the file from the electronic apparatus, and converting the information on the printing option into a control command recognizable by the image forming apparatus, and the transmitting may include transmitting the converted control command and the file to the image forming apparatus.

The method may further include generating printing data by rendering the file included in the dialogue message, and the transmitting may include transmitting the generated printing data to the image forming apparatus.

The method may further include receiving a dialogue message including information on a printing option to be applied to the file from the electronic apparatus, and the generating the printing data may include generating printing data for the file by applying the received printing option.

The method may further include checking a progress of printing of the transmitted file, and transmitting a dialogue message including the checked progress of printing to the electronic apparatus.

The receiving the dialogue message may include receiving the dialogue message using an XMPP.

The method may further include, if information on a user account of the electronic apparatus is received, searching a dialogue partner corresponding to the user account, and transmitting the searched dialogue partner to the electronic apparatus.

The searching the image forming apparatus may include searching a physical address of the image forming apparatus to perform the printing job using the account information included in the dialogue message, a pre-stored physical address of the image forming apparatus, account information of the image forming apparatus, and information on a user who will use the image forming apparatus.

The method may further include receiving at least one of a physical address of a new image forming apparatus, account information of the new image forming apparatus, and a user account of a user who will use the new image forming apparatus, and adding the new image forming apparatus as a dialogue partner for each user account.

According to an aspect of still another embodiment, there is provided a computer readable medium including a program to execute a method for controlling printing of an electronic apparatus, the method for controlling printing including receiving selection of an image forming apparatus having an account address as a dialogue partner, receiving selection of a file to be printed by the image forming apparatus selected as the dialogue partner, and transmitting the selected file to the message server in a dialogue message method.

Additional aspects and advantages of embodiments will be set forth in the detailed description, will be obvious from the detailed description, or may be learned by practicing embodiments.

BRIEF DESCRIPTION OF THE DRAWINGS

The above and/or other aspects will be more apparent by describing in detail embodiments, with reference to the accompanying drawings, in which.

DETAILED DESCRIPTION

Figure 1:
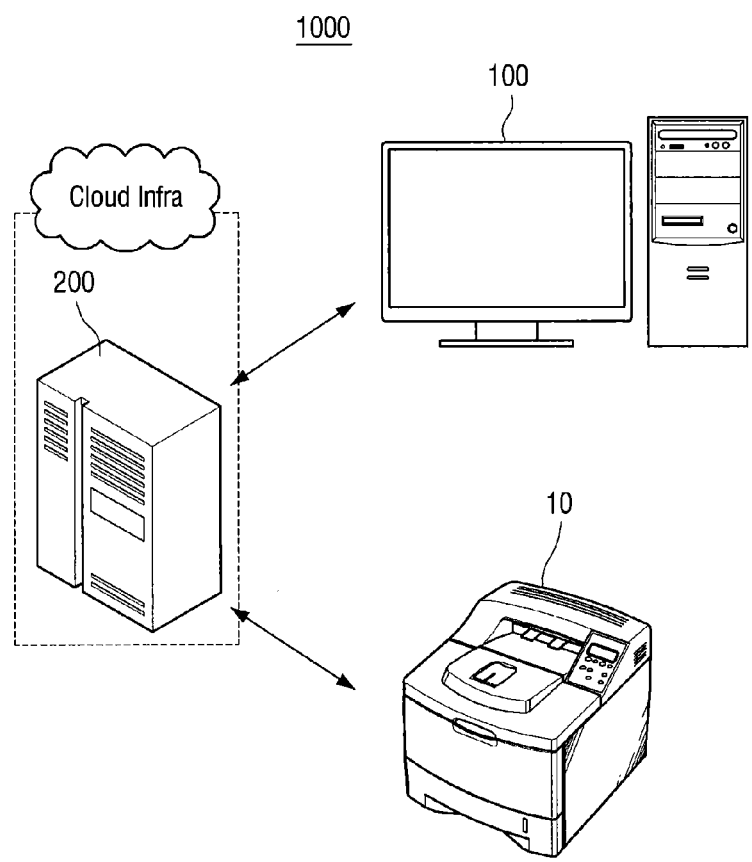
FIG. 1 is a block diagram illustrating a printing system according to an embodiment.

Reference will now be made in detail to embodiments, examples of which are illustrated in the accompanying drawings, wherein like reference numerals refer to the like elements throughout. Embodiments are described below to explain by referring to the figures.

Hereinafter, embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of embodiments. Thus, it is apparent that embodiments may be carried out without those specifically defined matters. Also, functions or elements known in the related art are not described in detail since they would obscure embodiments with unnecessary detail.

FIG. 1 is a block diagram illustrating a printing system according to an embodiment.

Referring to FIG. 1, a printing system 1000 includes an image forming apparatus 10, an electronic apparatus 100, and a message server 200.

The electronic apparatus 100 may exchange a dialogue message with the message server 200. The electronic apparatus 100 may transmit a file to be printed to the message server 200 as a dialogue message. The electronic apparatus 100 may transmit a printing option to be applied to the file to be printed to the message server 200 as a dialogue message. The configuration and operation of the electronic apparatus 100 will be explained below in detail with reference to FIG. 2. The electronic apparatus 100 may be, for example, a desktop computer, a notebook computer, a tablet, a mobile phone, a portable multimedia player (PMP), and an MP3 player.

The message server 200 may exchange a dialogue message with the electronic apparatus 100. Specifically, the message server 200 may receive a dialogue message from the electronic apparatus 100 and may transmit the received dialogue message to an object which is set to receive the dialogue message (for example, a dialogue partner). If the message server 200 receives a dialogue message for the electronic apparatus 100 from another electronic apparatus, the message server 200 may transmit the received dialogue message to the electronic apparatus 100.

If the message server 200 receives a dialogue message for the image forming apparatus 10 connected thereto, the message server 200 may transmit a file included in the dialogue message to the image forming apparatus 10 in order to perform a printing job. If a printing option is included in the dialogue message, the message server 200 may transmit information on the printing option to be applied to the corresponding file to the image forming apparatus 10. The message server 200 may transmit various information concerning the printing job (for example, a progress of printing or completion of printing) to the electronic apparatus 100 as a dialogue message. The configuration and operation of the message server 200 will be explained below in detail with reference to FIG. 3.

The image forming apparatus 10 may be connected to the message server 200 and may receive printing data or a file from the message server 200 to perform a printing job. The image forming apparatus 10 may transmit its own state information and information concerning the printing job to the message server 200. The image forming apparatus 10 is not only a printer that performs only a printing job but also a multifunction peripheral that performs scanning and/or copying in addition to printing.

As described above, since the printing system 1000 according to embodiment may perform printing simply by selecting the image forming apparatus 10 as a dialogue partner on a messenger program and selecting a file to be printed, a user may easily perform a printing job in a clouding computing environment. Also, since a general messenger program installed in the electronic apparatus 100 is used, it is possible to perform printing jobs for various image forming apparatuses without installing a separate program in the electronic apparatus 100.

Although the message server 200 is connected the single electronic apparatus 100 in FIG. 1, the message server 200 may be connected a plurality of electronic apparatuses 100. Also, although the message server 200 is directly connected to the electronic apparatus 100, a router or another message server may be located between the message server 200 and the electronic apparatus 100.

Also, although the message server 200 is connected the single image forming apparatus 10 in FIG. 1, the message server 200 may be connected to a plurality of image forming apparatuses 10. Also, although the message server 200 is directly connected to the image forming apparatus 10, a router or another server may be located between the message server 200 and the image forming apparatus 10.

Figure 2:
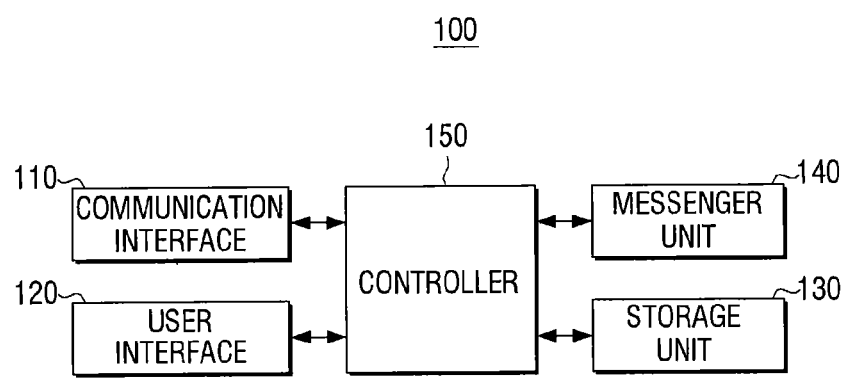
FIG. 2 is a block diagram illustrating an electronic apparatus of FIG. 1 in detail.

FIG. 2 is a block diagram illustrating the electronic apparatus of FIG. 1 in detail.

Referring to FIG. 2, the electronic apparatus 100 may include a communication interface 110, a user interface 120, a storage unit 130, a messenger unit 140, and a controller 150.

The communication interface 110 is connected to the message server 200. For example, the communication interface 110 is adapted to connect the electronic apparatus 100 to an external apparatus such as the message server 200 and may access the message server 200 through a local area network (LAN) or the internet or may access the message server 200 in a wireless communication method (for example, GSM, UMTS, LTE, and etc.).

The communication interface 110 may transmit and receive a dialogue message. Specifically, the communication interface 110 may transmit a dialogue message generated in the messenger unit 140, which will be explained in detail below, to the message server 200 under control of the messenger unit 140, and may transmits a dialogue message received from the message server 200 to the messenger unit 140.

The user interface 120 has a plurality of function keys through which a user sets or selects various functions supported by the electronic apparatus 100, and may display various information provided by the electronic apparatus 100. The user interface 120 may be realized as a device implementing input and output simultaneously such as a touch pad or may be realized as a device combining a mouse and a monitor.

The user interface 120 may receive a command to execute a messenger program. If a messenger program is driven according to such an execution command, a user interface window may be displayed to receive user account information. Accordingly, the user inputs his/her own account information into the user interface window. The messenger program may be an instant messenger program using an extensible messaging and presence protocol (XMPP) and may be an instant messenger dedicated for printing or a messenger program using a currently commercialized XMPP (for example, Google talk, MSN Messenger, AOL Messenger, or YAHOO Messenger).

The user interface 120 may display one or more dialogue partners corresponding to the user account. Specifically, if information on the user account input by the user is transmitted to the message server 200 and the messenger unit 140 receives information on the one or more dialogue partners corresponding to the user account from the message server 200, the user interface 120 may display the one or more received dialogue partners.

The user interface 120 may receive account information of a new image forming apparatus. Specifically, if an image forming apparatus that the user wishes to use in order to perform a printing job is not displayed as a dialogue partner, the user may input account information of a new image forming apparatus into the user interface window provided by the user interface 120.

If the account information of the new image forming apparatus is input, the user interface 120 may display the dialogue partners to which the new image forming apparatus is added as a dialogue partner. If the account information of the new image forming apparatus input by the user is incorrect or if the user has no authority to use the new image forming apparatus, the user interface 120 may display an error message or a guide message to obtain authority.

The user interface 120 may receive selection of at least one dialogue partner from among the displayed dialogue partners. At this time, the user interface 120 may display a dialogue box for the selected dialogue partner.

If the dialogue partner selected by the user is an image forming apparatus 10 having account information, the user interface 120 may display a dialogue box for the image forming apparatus 10. At this time, the user interface 120 may display state information of the image forming apparatus 10.

Specifically, if information on the dialogue partner selected by the user is transmitted to the message server 200 and state information of the image forming apparatus is received from the message server 200, the user interface 120 may display the state information of the image forming apparatus 10. The state information may include information on an operation state of the image forming apparatus 10 and information on a printing option applicable to the image forming apparatus 10.

The user interface 120 may receive selection of a file to be printed in the selected image forming apparatus 10. Specifically, the user interface 120 may receive selection of a file placed on the dialogue box in a drag-and-drop method as the file to be printed. The file to be printed may be selected through a search box. The user may also select a plurality of files to be printed in the selected image forming apparatus 10.

Although the file to be printed is selected after the dialogue box for the image forming apparatus 10 has been displayed in the above example, the file to be printed may be selected before the dialogue box is displayed. For example, the file to be printed may be directly selected through the user interface window which displays the dialogue partners.

The user interface 120 may receive a printing option to be applied to the corresponding file through the displayed dialogue box. Specifically, the user may input the printing option to be applied to the corresponding file by inputting a name of the printing option on the displayed dialogue box or input a number corresponding to the printing option.

For example, if a duplex printing option is to be applied to the corresponding file, the user may input the printing option by inputting "duplex printing" on the dialogue box. Also, for example, if the state information is received and "1. Duplex printing, 2. Monochrome printing" is displayed on the dialogue box as an applicable printing option, the user may input the printing option by inputting "1" into the dialogue box.

The user interface 120 may display a progress of printing of the transmitted file on the dialogue box. Specifically, the user interface 120 may display information on the progress of printing of the file received through the messenger unit 140 on the dialogue box.

The storage unit 130 stores a file. Specifically, the storage unit 130 may store a file generated by a document generation application. For example, the stored file may be a document file having extension such as DOC or HWP, an image file having extension such as BMP or JPG, or a printing data file having extension such as PDF or XPS.

The storage unit 130 stores a dialogue message. Specifically, the storage unit 130 may store texts input by the user on the dialogue box and the dialogue message received through the messenger unit 140.

The storage unit 130 may be an internal storage medium or an external storage medium of the electronic apparatus 100, for example, a removable disk including a USB memory or a web server over a network.

The messenger unit 140 exchanges the dialogue message with the message server 200. Specifically, the messenger unit 140 may generate the dialogue message by adding account information of the electronic apparatus 100 (for example, user's account information) and account information of the dialogue partner (for example, account information of the image forming apparatus) to the message input through the user interface 120, and may control the communication interface 110 to transmit the generated dialogue message to the message server 200 using an XMPP.

The messenger unit 140 may control the user interface 120 to display the dialogue message received from the message server 200 using the XMPP on the dialogue box. In this embodiment, the dialogue message is displayed only on the dialogue box. However, the dialogue message may be displayed on a tooltip window or a pop-up window, which displays only a corresponding dialogue message.

The controller 150 may control the components of the electronic apparatus 100. Specifically, the controller 150 receives a messenger execution command through the user interface 120, drives the messenger program, and receives information on a user account through the user interface 120. The controller 150 may control the messenger unit 140 to receive one or more dialogue partners corresponding to the input user account information.

If a dialogue message for the one or more dialogue partners selected by the user is input, the controller 150 may control the messenger unit 140 to transmit the dialogue message to the selected one or more dialogue partners, and, if a dialogue message is received through the messenger unit 140, may control the user interface 120 to display the dialogue message on the dialogue box.

As described above, since the electronic apparatus 100 according to embodiment may perform a printing job by transmitting the selected file to the selected image forming apparatus as a dialogue message, the user may perform the printing job easily. Also, since a general messenger program installed in the electronic apparatus 100 is used, it is possible to perform printing jobs for various image forming apparatuses without installing a separate printing program.

Figure 3:
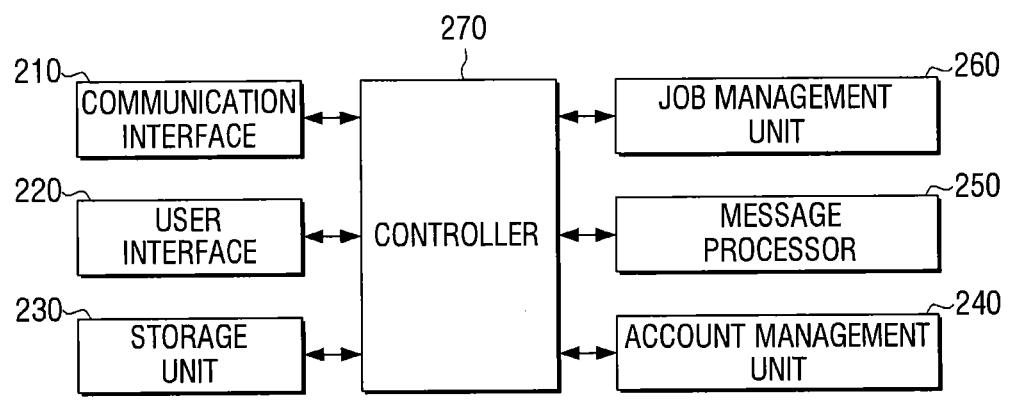
FIG. 3 is a block diagram illustrating a message server of FIG. 1 in detail.

FIG. 3 is a block diagram illustrating the message server of FIG. 1 in detail.

Referring to FIG. 3, the message server 200 may include a communication interface 210, a user interface 220, a storage unit 230, an account management unit 240, a message processor 250, a job management unit 260, and a controller 270.

The communication interface 210 is adapted to connect the message server 200 to at least one electronic apparatus 100, and may access the electronic apparatus 100 through a LAN or the Internet or may access the electronic apparatus 100 in a wireless communication method (for example, GSM, UMTS, LTE and etc.).

The communication interface 210 is connected to at least one image forming apparatus 10. Specifically, the communication interface 210 may access the image forming apparatus 10 in a wireless or wired manner through a LAN or the Internet or access the image forming apparatus 10 through a universal serial bus (USB) port.

The communication interface 210 transmits or receives a dialogue message. Specifically, the communication interface 210 may transmit or receive the dialogue message under control of the message processor 250, which will be described in detail below.

The communication interface 210 obtains state information of the image forming apparatus 10. Specifically, the communication interface 210 may request and receive the state information including information on an operation state of the image forming apparatus 10 and information on an applicable printing option.

The communication interface 210 transmits printing data to the image forming apparatus 10. Specifically, the communication interface 210 may directly transmit a file received from the electronic apparatus 100 to the image forming apparatus 10 or may transmit printing data rendered by the job management unit 260 to the image forming apparatus 10.

More specifically, if the image forming apparatus 10 supports direct printing, by which a file may be directly printed, the communication interface 210 may transmit the file to the image forming apparatus 10 as it is. If a dialogue message concerning a printing option is received from the electronic apparatus 100, the communication interface 210 may transmit a control command generated in the job management unit 260 (a printing option converted into a format recognizable by the image forming apparatus 10) to the image forming apparatus 10.

If the image forming apparatus 10 does not support the direct printing, by which a file may be directly printed, the communication interface 210 may transmit printing data rendered by the job management unit 260 to the image forming apparatus 10.

The communication interface 210 may receive information on a progress of printing of the image forming apparatus 10.

The user interface 220 has a plurality of function keys through which the user sets or selects various functions supported by the message server 200, and may display various information provided by the message server 200. The user interface 220 may be a device implementing input and output simultaneously such as a touch pad or may be a device combining an input device such as a mouse or a keyboard and a display device such as a cathode ray tube (CRT) monitor, a liquid crystal display (LCD) monitor, or a light emitting diode (LED).

The user interface 220 may receive information to register an account of the image forming apparatus 10. Specifically, the user interface 220 may receive a physical address and an account address of the image forming apparatus 10 and account information of a user who will use the image forming apparatus 10, in order to register the account of the image forming apparatus 10 which is connected to the message sever 200 to perform a printing job. The input information may be stored in the storage unit 230.

Also, through the user interface 220, the user may edit the pre-stored account information of the image forming apparatus 10. For example, the user interface 220 may receive a user command to add or change a user who will use the image forming apparatus 10.

The storage unit 230 stores information on the user account. The information on the user account includes information to authenticate the user (for example, an ID and a password) and information on a dialogue partner of the user.

The storage unit 230 stores information on the account of the image forming apparatus 10. The information on the account of the image forming apparatus 10 may include a physical address and an account address of the image forming apparatus 10, and a user account of a user who may use the image forming apparatus 10.

The storage unit 230 stores a file included in the dialogue message. The storage unit 230 may store printing data generated in the job management unit 260, which will be described below.

The storage unit 230 may store the dialogue message. Specifically, the storage unit 230 may store the dialogue message exchanged through the communication interface 210.

The storage unit 230 may be an internal storage medium or an external storage medium of the message server 200, for example, a removable disk including a USB memory or a file server over a network.

The account management unit 240 manages the user account and the account of the image forming apparatus 10. Specifically, the account management unit 240 may delete, add, or change the information on the user account and the information on the image forming apparatus 10, which are pre-stored in the storage unit 230, according to a control command of the user.

If the account management unit 240 receives login information from the electronic apparatus 100, the account management unit 240 may identify whether the user is a registered user or not using the information on the user account pre-stored in the storage unit 230, and may control the communication interface 110 to notify the electronic apparatus 100 of a dialogue partner of the authorized user.

If the account management unit 240 receives a printing job request (for example, transmission of a dialogue message for the image forming apparatus) from the electronic apparatus 100, the account management unit 240 may identify whether the user of the electronic apparatus 100 is a registered user for the image forming apparatus 10 or not using the account information of the image forming apparatus 10 pre-stored in the storage unit 230, and may control the job management unit 260 to perform a printing job according to the printing job request of the authorized user.

In response to a printing job request of a user who has no authority, the account management unit 240 may control the message processor 250 to transmit a dialogue message to inform that the user has no authority to use the image forming apparatus 10 or a dialogue message to inform how to obtain the authority to the electronic apparatus 100.

The message processor 250 exchanges the dialogue message with the electronic apparatus 100. Specifically, the message processor 250 identifies account information of a receiving side in the dialogue message received through the communication interface 210 and may control the communication interface 210 to transmit the dialogue message to a physical address corresponding to the account information of the receiving side.

The message processor 250 may generate a dialogue message about the state information and the progress of printing of the image forming apparatus 10 and may control the communication interface 210 to transmit the dialogue message to the electronic apparatus 100, which has requested a printing job. The message processor 250 may transmit the dialogue message using XMPP. The generated dialogue message may include account information of the electronic apparatus 100 (for example, user's account information), account information of the dialogue partner (for example, account information of the image forming apparatus 10), and a message body (for example, the state information or the progress information of printing of the image forming apparatus 10).

The job management unit 260 obtains the state information. Specifically, the job management unit 260 may obtain information on an operation state of the image forming apparatus 10 connected to the message server 200 and information on an applicable printing option.

If the job management unit 260 receives a dialogue message including a file, the job management unit 260 determines whether the image forming apparatus 10 to perform a printing job supports direct printing or not, and, if the image forming apparatus 10 supports the direct printing, the job management unit 260 may control the communication interface 210 to transmit the file to the image forming apparatus 10. If a dialogue message including a printing option is received from the electronic apparatus 100 or if the dialogue message is received along with the file, the job management unit 260 may convert the printing option into a control command recognizable by the image forming apparatus 10 and may control the communication interface 210 to transmit the printing option, which has been converted into the control command, and file to the image forming apparatus 10.

In this embodiment, if the image forming apparatus 10 supports the direct printing, the file is transmitted to the image forming apparatus 10. However, even if the image forming apparatus 10 supports the direct printing, printing data may be generated by rendering the file and may be transmitted to the image forming apparatus 10.

The job management unit 260 may generate the printing data by rendering the file. Specifically, the job management unit 260 may generate the printing data recognizable by the image forming apparatus 10 by rendering the received file. At this time, if a dialogue message including a printing option is received from the electronic apparatus 100, the job management unit 260 may generate the printing data using the printing option.

The controller 270 may control the components of the message server 200. Specifically, if a dialogue message indicating the image forming apparatus 10 as a dialogue partner is received from the electronic apparatus 100, the controller 270 may control the job management unit 260 such that a file included in the dialogue message is printed in the image forming apparatus 10.

As described above, the message server 200 according to embodiment may perform a printing job by transmitting the file received as the dialogue message to the image forming apparatus 10 as it is or converting the file into the printing data and transmitting the printing data to the image forming apparatus 10. Also, the message server 200 may receive the printing option as the dialogue message and may process the printing option to be applied to the file and process the file to be printed.

In explaining FIG. 3, the message server 200 receives the file stored in the electronic apparatus 100 as the dialogue message and prints the file. However, the message server 200 may print a file that is not stored in the electronic apparatus 100 but stored in a file server, that is, may print a file in a cloud computing environment.

Figure 4:
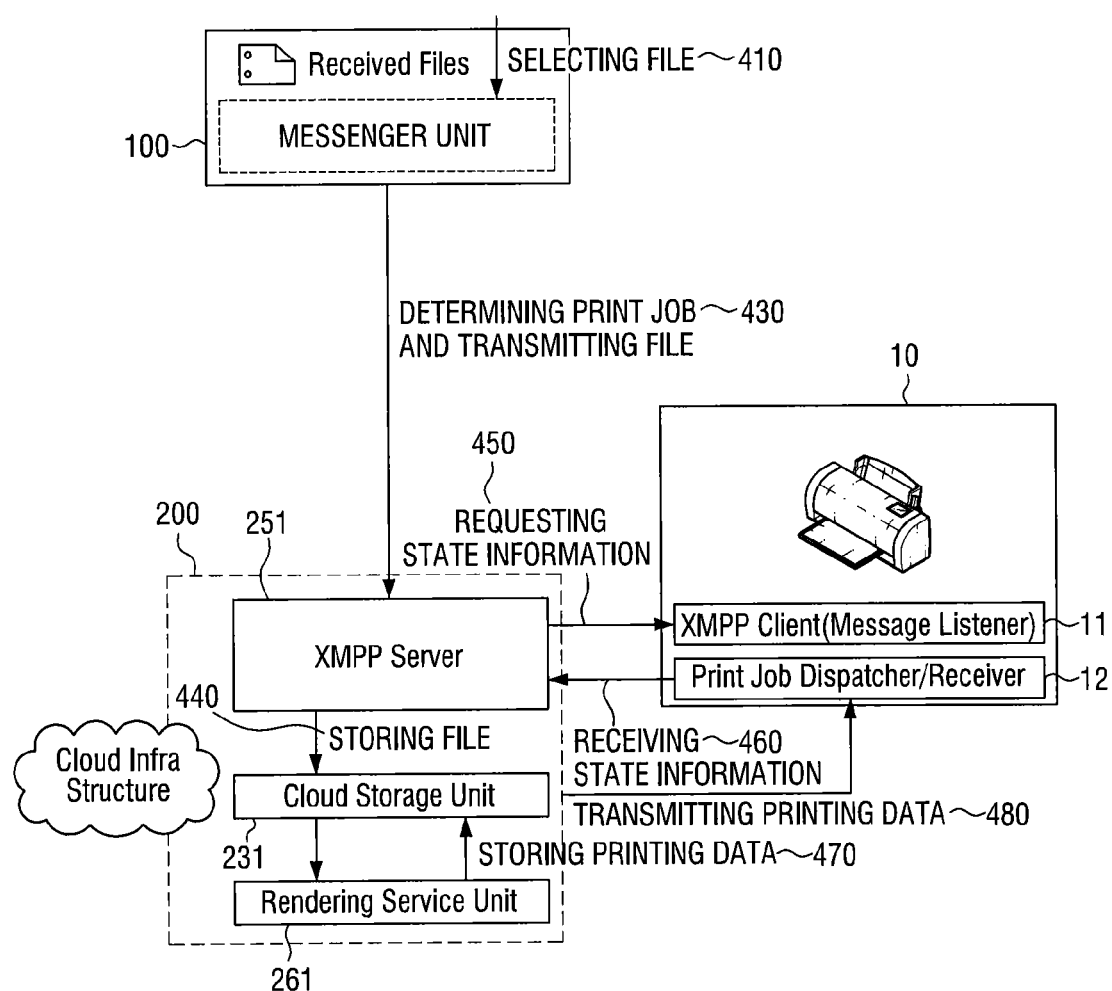
FIG. 4 is a view to explain an operation of the printing system according to an embodiment.

FIG. 4 is a view to explain an operation of the printing system 1000 according to an embodiment. In FIG. 4, in explaining the operation of the printing system 1000, the could computing environment is used as an example, but not limited thereto. Further, in FIG. 4, only the components used to describe the operation of the printing system 1000 are shown.

Referring to FIG. 4, the electronic apparatus 100 receives selection of a file to be printed and includes a messenger unit to transmit a dialogue message for the image forming apparatus 10, which includes the selected file, to the message server 200 (410).

The message server 200 includes a XMPP server 251 which receives the dialogue message, determines that the dialogue message is a printing job request and receives the corresponding file (430).

If the file is received, the message server 200 stores the received file in cloud storage unit 231 (440) and requests state information from the image forming apparatus 10 which includes a XMPP client 11 (Message Listener) and print job dispatcher/receiver 12 and receives the state information (450, 460).

If the state information is received, the message server 200 renders the stored file using a rendering service unit 261 based on the state information. The job management unit 260 provides the rendering service to render the received files. The rendered printing data is temporarily stored in the cloud storage unit 231 (470). The printing data is transmitted to the image forming apparatus 10 (480) and accordingly the image forming apparatus 10 performs a printing job.

Figure 5:
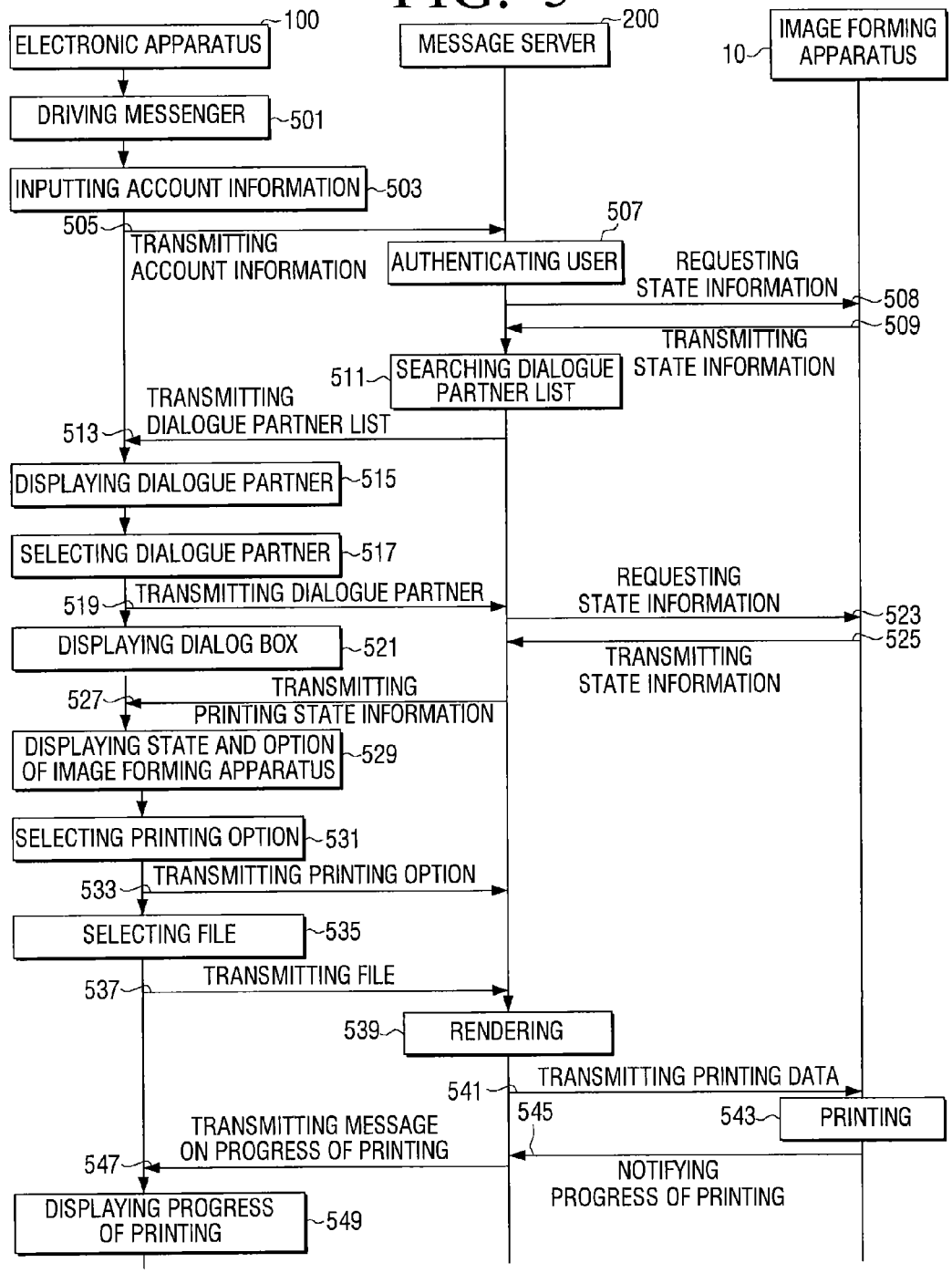
FIG. 5 is a diagram to explain operations of the electronic apparatus, the message server, and an image forming apparatus.

FIG. 5 is a diagram to explain operations of the electronic apparatus, the message server, and the image forming apparatus.

Referring to FIG. 5, the electronic apparatus 100 drives a messenger program according to a user's command to execute a messenger program (501). The electronic apparatus 100 receives user account information through the driven messenger program (503).

The input user account information is transmitted to the message server 200 (505) and the message server 200 authenticates whether the user account information is appropriate (507) and searches a dialogue partner corresponding to the user account (511). At this time, the message server 200 may request state information from the image forming apparatus 10 connected thereto and receive the state information (508, 509). The state information may be previously requested or may be requested afterward when printing option information is requested and received.

If the dialogue partner is searched, the message server 200 transmits information on the searched dialogue partner to the electronic apparatus 100 (513). The electronic apparatus 100, which has received the information on the searched dialogue partner, may display the received dialogue partner (515).

The user may select an image forming apparatus 10 to perform a printing job as a dialogue partner from among the displayed dialogue partners (517). If the dialogue partner is selected, the electronic apparatus 100 may transmit a message indicating that the dialogue partner has been selected to the message server 200 (519), and may display a dialogue box for the corresponding image forming apparatus 10 (521). At this time, the message server 200 may request state information of the image forming apparatus 10 which has been selected as a dialogue partner (for example, information on whether it is possible to print and an applicable printing option) from the image forming apparatus 10 and may receive the state information (523, 525). The message server 200 may transmit the state information to the electronic apparatus 100 as a dialogue message (527).

The electronic apparatus 100, which has received the dialogue message including the state information, may display the state information on the dialogue box for the image forming apparatus 10 (529). At this time, if the user inputs a printing option to be applied to the printing job into the dialogue box (531), the electronic apparatus 100 may transmit a dialogue message including information on the printing option input by the user to the message server 200 (533).

If the user places a file to be printed on the dialogue box in a drag-and-drop method, that is, if the user selects a file to be printed (535), the electronic apparatus 100 may transmit a dialogue message including the selected file to the message server 200 (537).

The message server 200, which has received the dialogue message including the file, renders the file by applying the printing option included in the already received dialogue message (539), and transmits printing data generated by rendering to the image forming apparatus 10 (541). The image forming apparatus 10, which has received the printing data, performs the printing job (543), and notifies the message server 200 of a progress of the printing job or a result of the printing job (545).

The message server 200, which has received the progress of the printing job or the result of the printing job, may transmit a dialogue message including the progress of the printing job or the result of the printing job to the electronic apparatus 100 (547).

The electronic apparatus 100, which has received the dialogue message including the progress of the printing job or the result of the printing job, may display the progress of the printing job or the result of the printing job on the dialogue box (549).

In explaining FIG. 5, the message server 200 renders the received file and transmits the printing data generated by rendering to the image forming apparatus 10. However, if the image forming apparatus 10 supports direct printing, by which a file can be directly printed, the message server 200 may transmit the received file to the image forming apparatus 10 without rendering the file.

Figure 6:
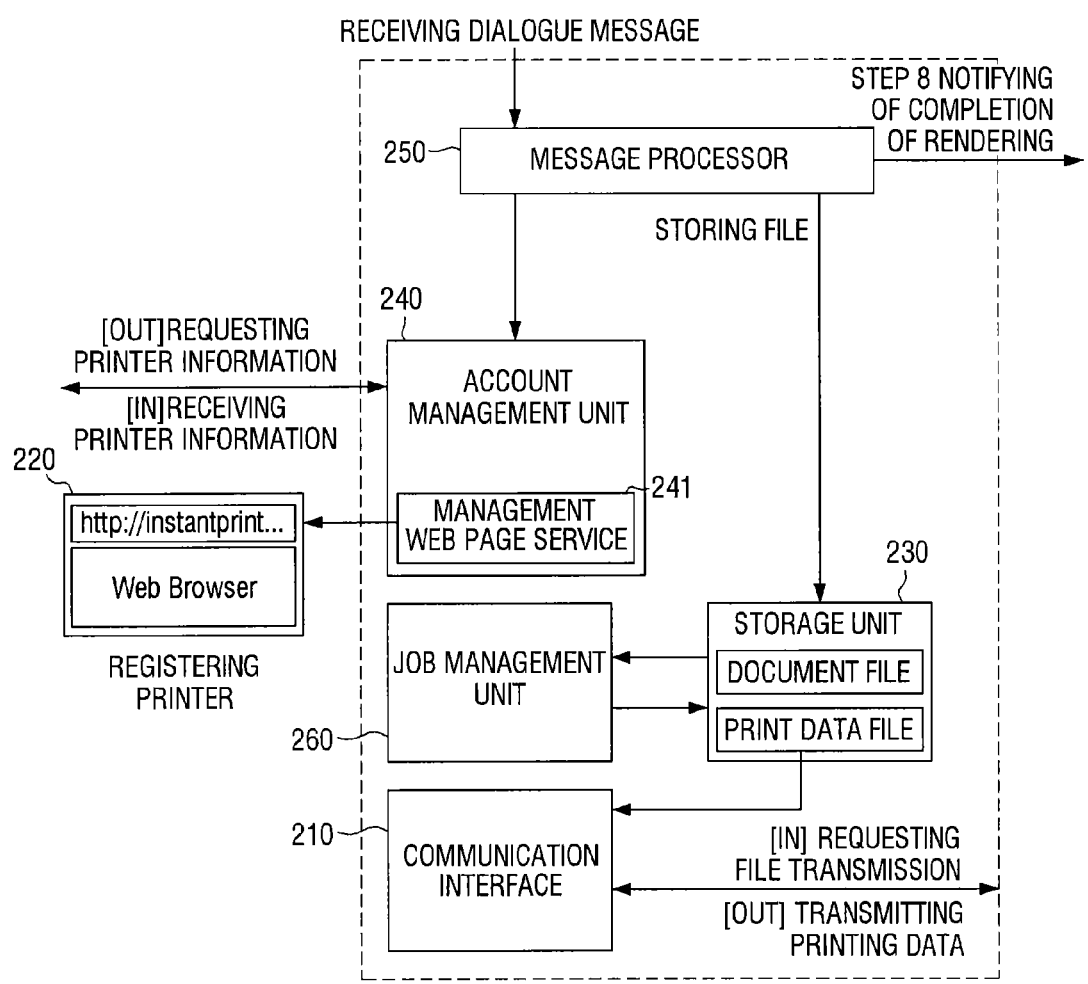
FIG. 6 is a view to explain an operation of the message server according to an embodiment.

FIG. 6 is a view to explain an operation of the message server according to an embodiment.

Referring to FIG. 6, the message server 200 receives a dialogue message from the electronic apparatus 100.

If the dialogue message is received, the message processor 250 determines whether the received dialogue message is for the image forming apparatus 10, and, if it is determined that the dialogue message is for the image forming apparatus 10, the message processor 250 controls the account management unit 240 to check whether the user of the electronic apparatus 100, which has transmitted the dialogue message, has authority to use the image forming apparatus 10.

The account management unit 240 may check whether the user has authority to use the image forming apparatus 10 using pre-stored information on an account of the image forming apparatus 10. If the user's printing request is a printing request for an image forming apparatus 10 connected to an external server, the account management unit 240 may request the external server to check whether the user who has requested the printing job has authority to use the image forming apparatus 10 or not. The account management unit 240 may include a management web page service unit 241 to communicate with a user interface 220 which may be a web browser. The user interface 220 may receive information to register an account of the image forming apparatus 10

If the authority is identified, the message processor 250 stores a file included in the dialogue message in the storage unit 230 and controls the job management unit 260 to perform a printing job with respect to the file stored in the storage unit 230.

The job management unit 260 reads out the file from the storage unit 230 and renders the file, and stores printing data generated by rendering in the storage unit 230. If the printing data is generated, the job management unit 260 may control the communication interface 210 to print the printing data in the image forming apparatus 10.

FIGS. 7 to 13 are views illustrating various examples of a user interface windows displayed on the electronic apparatus of FIG. 1.

Figure 7:
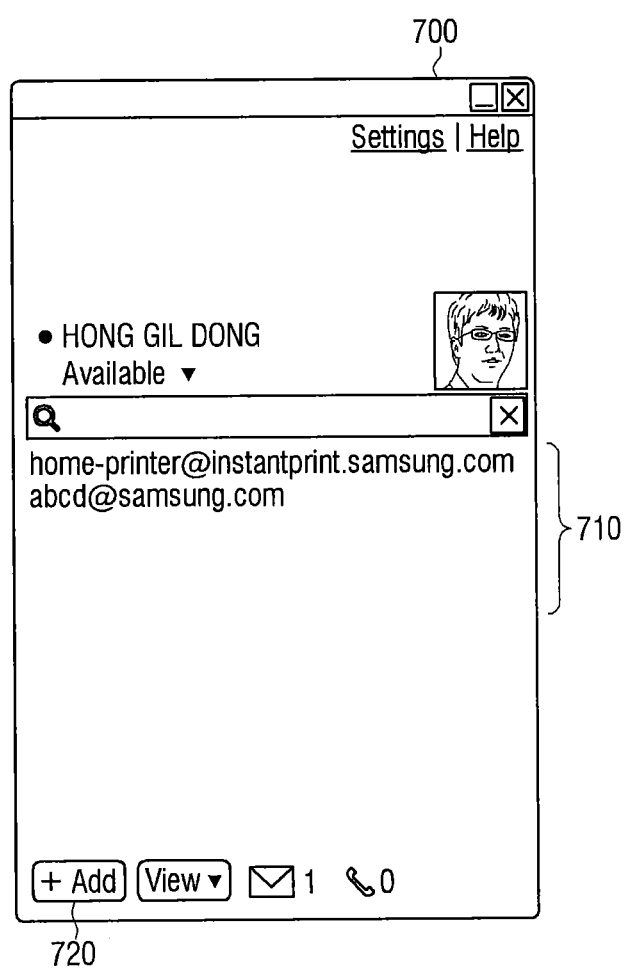
FIGS. 7 to 13 are views illustrating various examples of a user interface window displayed on the electronic apparatus of FIG. 1.

FIG. 7 illustrates an example of a user interface window to display a dialogue partner corresponding to a user account. Referring to FIG. 7, a user interface window 700 includes a region 710 to display a dialogue partner corresponding to a user account and a region 720 to add a dialogue partner.

Figure 10:
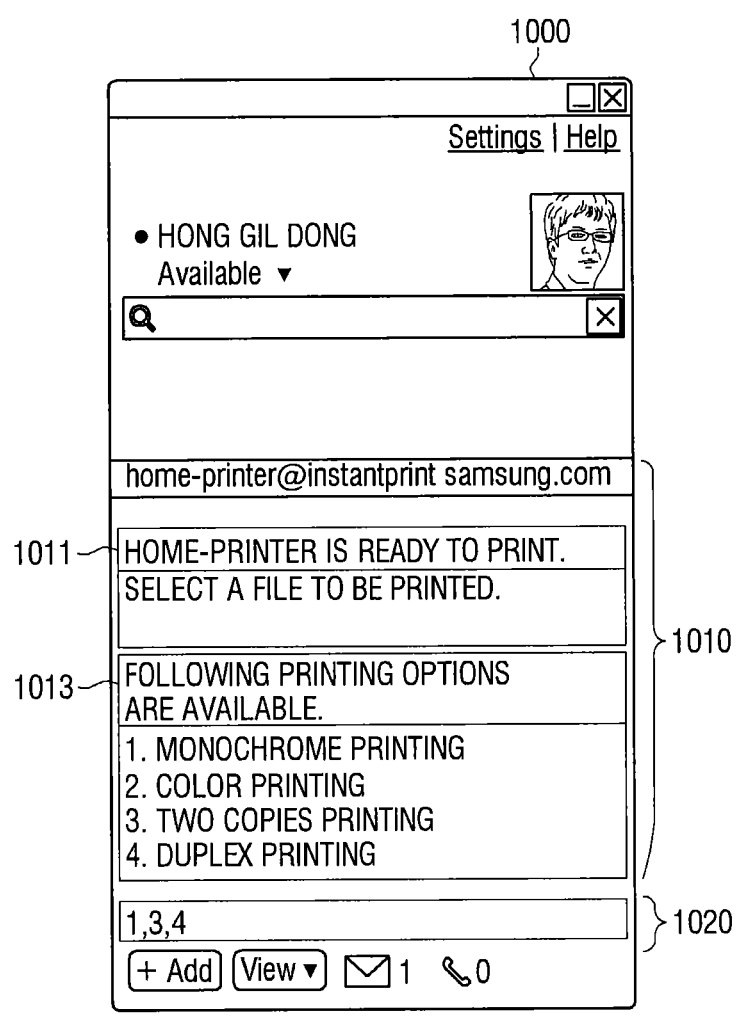

The region 710 displays one or more dialogue partners corresponding to a user account. In FIG. 7, two dialogue partners are displayed, for example. One of them is "homeprinter@instantprint.samsung.com" indicating an account of an image forming apparatus 10. Accordingly, the user may select a corresponding account to perform a printing job. If the user selects a corresponding account, a dialogue box may be displayed as shown in FIG. 10.

The region 720 receives a user command to add a dialogue partner. Specifically, if an image forming apparatus 10 to perform a printing job is not displayed as a dialogue partner, the user selects the second region 720 and displays account information of a new image forming apparatus to perform the printing job. If the region 720 is selected, a user interface window may be displayed as shown in FIG. 8.

Figure 8:
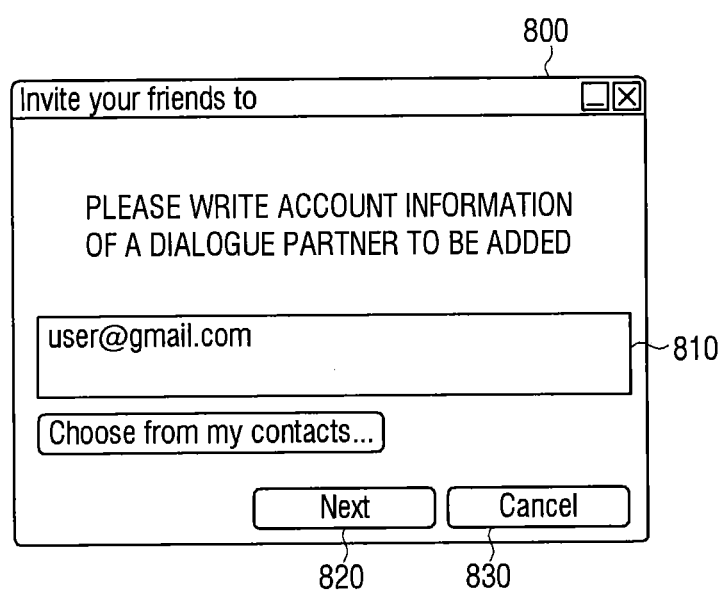

FIG. 8 is a view illustrating an example of a user interface window through which a new dialogue partner is input.

Referring to FIG. 8, a user interface window 800 includes a region 810 to receive account information of a new dialogue partner, a region 820 to receive a command to perform an operation of adding a dialogue partner based on the input account information, and a region 830 to receive a command to cancel the operation of adding the new dialogue partner.

The user may add an image forming apparatus 10 to perform a printing job by inputting a new dialogue partner (for example, account information of a new image forming apparatus) into the region 810 of the user interface window 800.

A file to be printed may be selected in two ways, for example. One way will be explained with reference to FIG. 9 and the other way will be explained with reference to FIG. 11.

Figure 9:
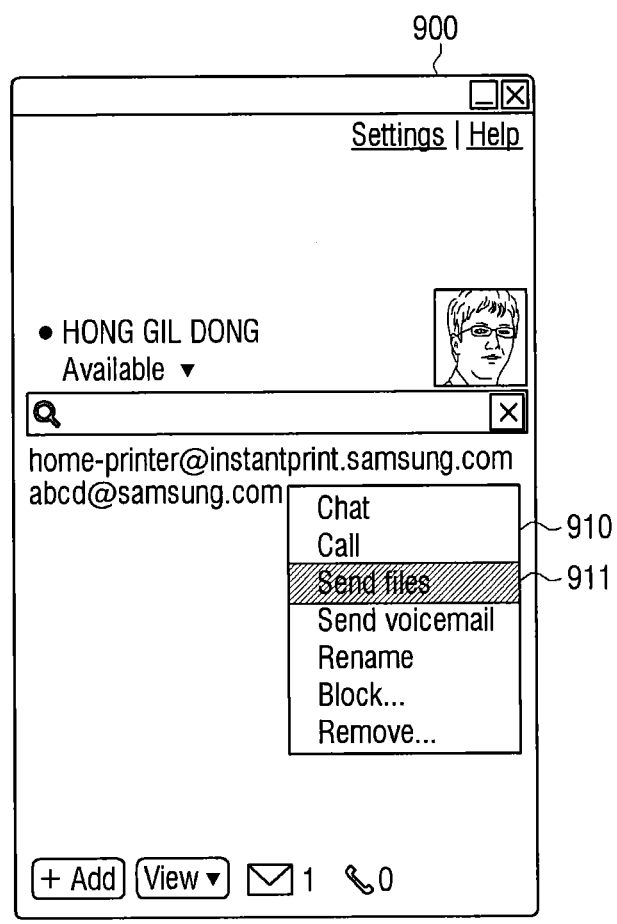

FIG. 9 is a view illustrating an example of a user interface window to receive selection of a file to be printed.

If the user presses, for example, a right button of a mouse on the dialogue partner of the user interface window of FIG. 7, a user interface window 900 is displayed as shown in FIG. 9. The user may select a file to be printed by selecting "Send files" 911 on a tooltip window 910. In this case, the electronic apparatus 100 may transmit a dialogue message including the file without displaying a separate dialogue box.

FIG. 10 is a view illustrating a dialogue box for the image forming apparatus.

Referring to FIG. 10, a dialogue box 1000 includes a region 1010 to display a received dialogue message and a region 1020 to receive a message to be transmitted.

The region 1010 to display the received dialogue message may display a dialogue message received from the message server 200. Specifically, as shown in FIG. 10, the region 1010 may display information 1011 on an operation state of the image forming apparatus 10 or may display information 1013 on a printing option applicable in the image forming apparatus 10. These messages may be displayed at the same time as the dialogue box is displayed or may be displayed after the dialogue box has been displayed. In this embodiment, the region 1010 to display the received dialogue message displays only the dialogue message received from the message server 200. However, a message input by the user may be also displayed.

The region 1020 to receive the message to be transmitted receives a message to be transmitted to a dialogue partner and may receive a printing option to be applied to the file to be printed. For example, if a duplex printing option is to be applied to the file, the user may input the printing option by entering "duplex printing" on the dialogue box. Also, as shown in FIG. 10, if state information is received and "1. Monochrome printing, 2. Color printing . . . " is displayed on the dialogue box as an applicable printing option, the user may input the printing option by entering "1" on the dialogue box.

Although the region 1020 to receive the message to be transmitted receives only the printing option to be applied to the file in this embodiment, the region 1020 may receive a control command concerning the printing job. For example, if the user transmits a dialogue message by inputting "printing option" into the region 1020, a printing option applicable in the image forming apparatus 10 may be received, and, if the user transmits a dialogue message by inputting "check state" into the region 1020, the state of the image forming apparatus 10 may be received.

Figure 11:
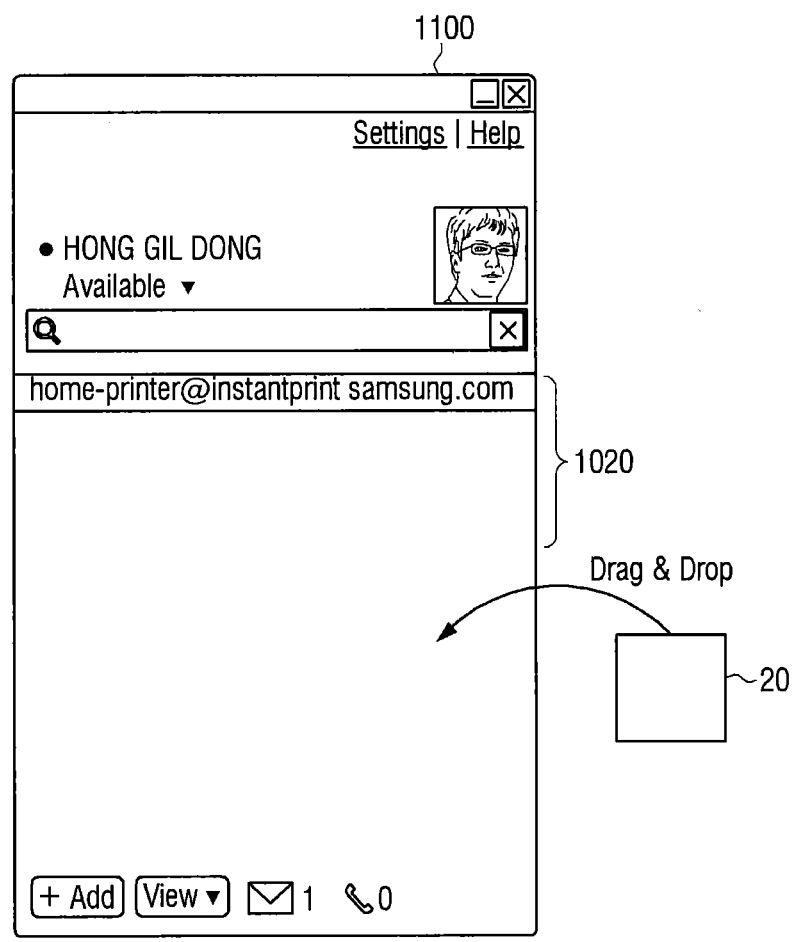

FIG. 11 is a view illustrating an example of a user interface window to receive selection of a file to be printed.

Referring to FIG. 11, a user interface window 1100 is a dialogue box for an image forming apparatus selected by the user. If the user places a file to be printed 20 on the dialogue box in a drag-and-drop method, the file placed on the dialogue box is selected as a file to be printed.

Figure 12:
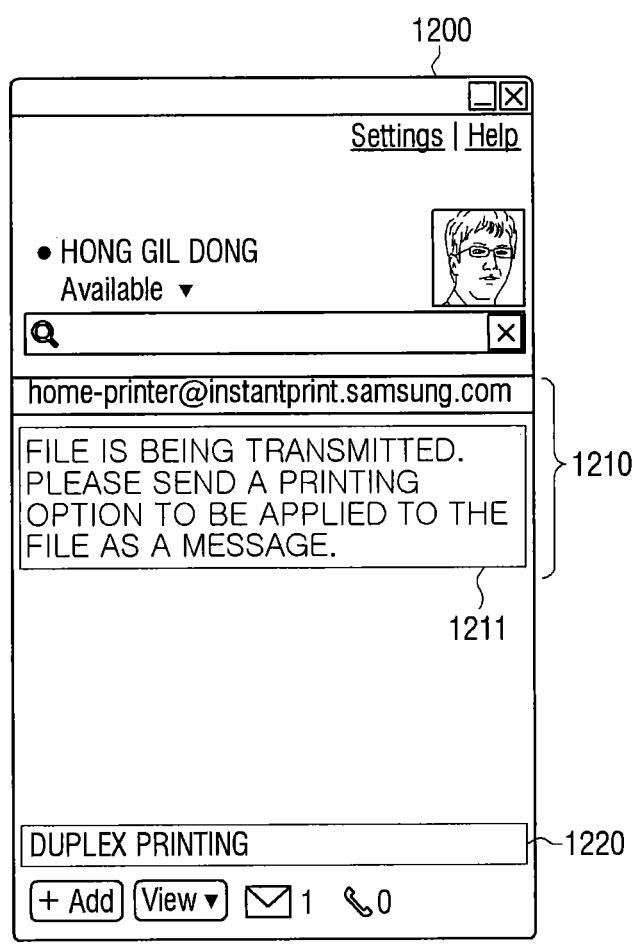

FIG. 12 is a view illustrating an example of a user interface window which is displayed after a dialogue message including a file has been transmitted.

Referring to FIG. 12, a user interface window 1200 includes a region 1210 to display a received dialogue message and a region 1211 to receive a message to be transmitted.

The region 1210 to display the received dialogue message may display a dialogue message received from the message server 200. Specifically, as shown in FIG. 12, the region 1210 may display information on a printing process and may inform that a printing option for a corresponding file can be set.

The region 1220 to receive the message to be transmitted may receive a message to be transmitted to a dialogue partner and may receive a printing option to be applied to the file to be printed. For example, if a duplex printing option is to be applied to the corresponding file, the user may input the printing option by inputting "duplex printing" into the region 1220 to receive the message to be transmitted. Through the region 1220 to receive the message to be transmitted, a control command concerning a printing job may be input. For example, a control command to stop the printing job may be input as a message "stop printing."

Figure 13:
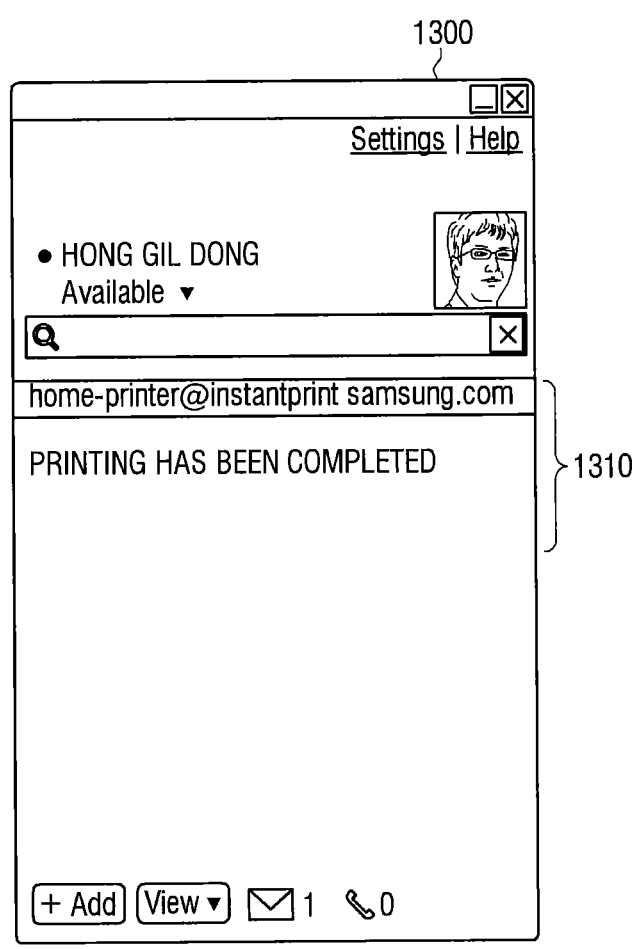

FIG. 13 is a view illustrating an example of a user interface window to display a progress of printing.

Referring to FIG. 13, a user interface window 1300 may display a progress of printing of a transmitted file on a region 1310, which displays a received message on a dialogue box. Accordingly, the electronic apparatus 100 may easily check the progress of the printing job at a remote distance.

Figure 14:
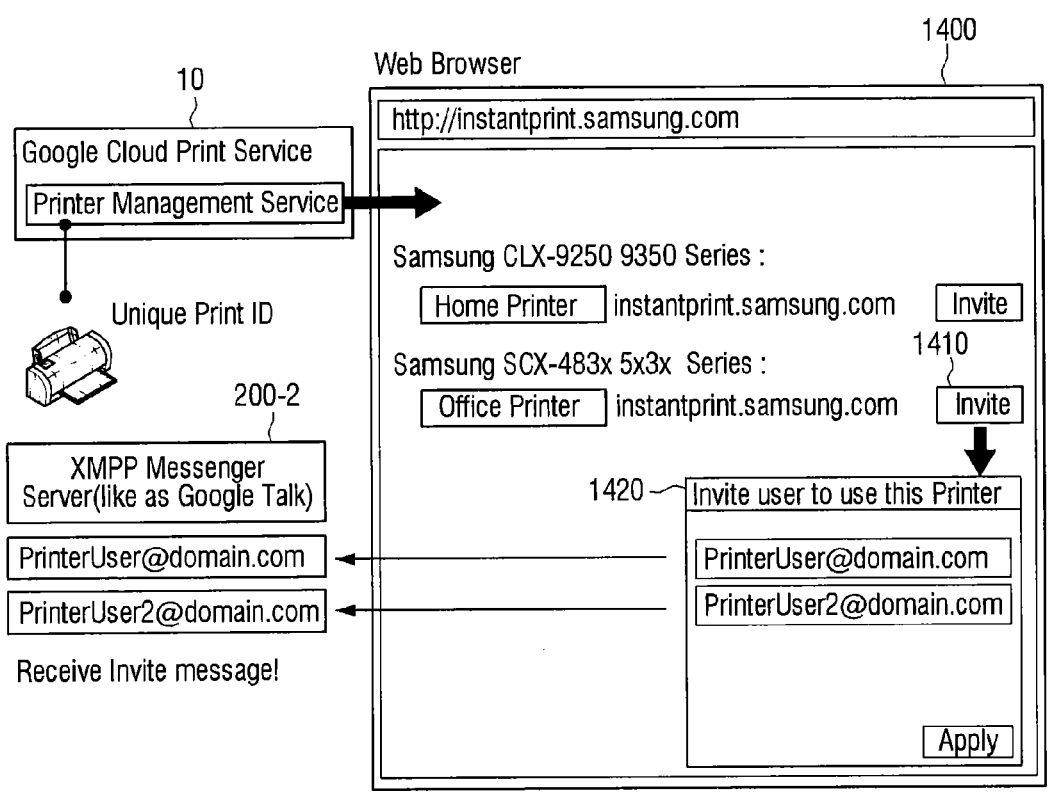
FIG. 14 is a view illustrating an example of a user interface window displayed on the message server of FIG. 1.

FIG. 14 is a view illustrating an example of a user interface window displayed on the message server of FIG. 1.

Referring to FIG. 14, a user interface window 1400 includes a region 1410 to display information on a newly added image forming apparatus, and a region 1420 to receive information on a user who will use the image forming apparatus.

Specifically, if a new image forming apparatus, for example a Google cloud print service which includes a printer management service, is connected to or registered at the message server 200 which includes XMPP Messenger Server 200-2, an administrator may store information on the image forming apparatus 10 and may set information on a user who will use the image forming apparatus 10 through the user interface window shown in FIG. 14. The account information on the image forming apparatus input through the above process may be stored in the storage unit 230 by the account management unit 240.

Figure 15:
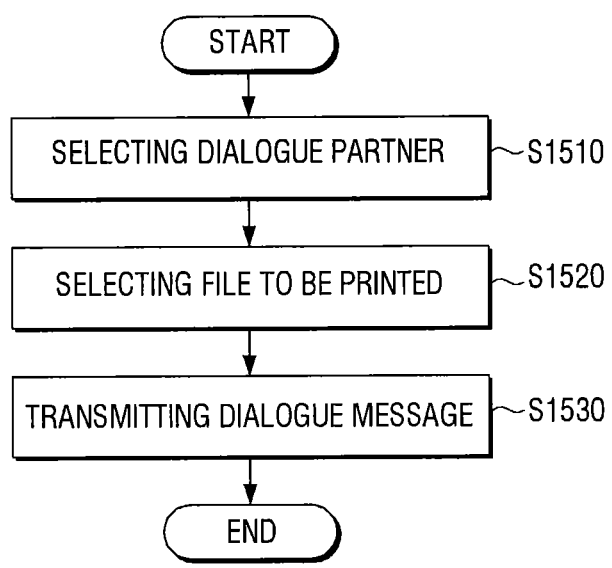
FIG. 15 is a flowchart illustrating a method for controlling printing of an electronic apparatus according to an embodiment.

FIG. 15 is a flowchart illustrating a method for controlling printing of an electronic apparatus according to an embodiment.

Referring to FIG. 15, an image forming apparatus 10 having an account address is selected as a dialogue partner (S1510). Specifically, if information on a user account of the electronic apparatus 100 is transmitted to a message server 200 and information on one or more dialogue partners corresponding to the user account is received from the message server 200, the one or more received dialogue partner(s) are displayed and an image forming apparatus 10 having an account address is selected as a dialogue partner from among the displayed dialogue partner(s).

A file to be printed is selected from the selected image forming apparatus (S1520). For example, a file placed on a dialogue box in a drag-and-drop method may be selected as the file to be printed. The file to be printed may be selected through a search box.

A dialogue message including the selected file and the account information of the image forming apparatus 10 is transmitted to the message server 200 (S1530). Specifically, a dialogue message may be generated by adding account information of the electronic apparatus 100 (for example, user's account information) and account information of the dialogue partner (for example, account information of the image forming apparatus) to the input message or file, and the generated dialogue message is transmitted to the message server 200 using an XMPP.

In the above-described method for controlling printing of the electronic apparatus 100 according to an embodiment, a printing job may be performed by transmitting the selected file to the selected image forming apparatus 10 as a dialogue message, so that the user may easily perform the printing job. The method of FIG. 15 may be executed in the electronic apparatus 100 having the configuration of FIG. 2, for example, and may be also executed in an electronic apparatus 100 having any other configuration.

The above-described method for controlling printing of the electronic apparatus 100 may be realized by at least one execution program to execute the above-described method for controlling printing of the electronic apparatus 100, and the execution program may be stored in a computer readable medium. The medium may also include, alone or in combination with the program instructions, data files, data structures, and the like. The program instructions recorded on the medium may be those specially designed and constructed for the purposes of embodiments, or they may be of the kind well-known and available to those having skill in the computer software arts. Examples of computer-readable medium include magnetic medium such as hard disks, floppy disks, and magnetic tape; optical medium such as CD-ROM disks, DVDs and Blu-rays; magneto-optical medium such as optical disks; and hardware devices that are specially configured to store and perform program instructions, such are read-only memory (ROM), random access memory (RAM), flash memory, and the like. The computer-readable medium may also be a distributed network, so that the program instructions are stored and executed in a distributed fashion. The program instructions may be executed by one or more processors. The computer-readable medium may also be embodied in at least one application specific integrated circuit (ASIC) or Field Programmable Gate ARRAY (FPGA), which executes program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice-versa.

Accordingly, each of the blocks of the present disclosure may be embodied as a computer recordable code on a computer readable medium. The computer readable recording medium may be a device that may store data readable by a computer system.

Figure 16:
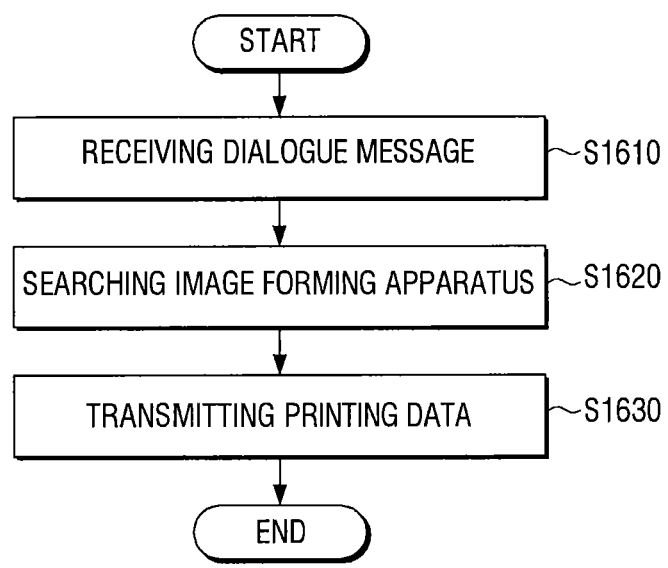
FIG. 16 is a flowchart illustrating a method for controlling printing of a message server according to an embodiment.

FIG. 16 is a flowchart illustrating a method for controlling printing of a message server according to an embodiment.

Referring to FIG. 16, a dialogue message including a file and an account address of an image forming apparatus 10 is received from an electronic apparatus 100 (S1610).

An image forming apparatus 10 to perform a printing job is searched based on the account address included in the dialogue message (S1620).

The file included in the dialogue message is transmitted to the searched image forming apparatus 10 (S1630). Specifically, if the image forming apparatus to perform the printing job supports direct printing, the file is transmitted to the image forming apparatus 10 as it is, and, if the image forming apparatus 10 does not support the direct printing, printing data is generated by rendering the file and transmitted to the image forming apparatus 10.

In the method for controlling printing of the message server 200 according to an embodiment, the printing job may be performed by transmitting the file included in the dialogue message to the image forming apparatus 10 as it is or converting the file into printing data and transmitting the printing data to the image forming apparatus 10. Also, a printing option may be received as a dialogue message and also the file may be printed by applying the printing option. The method for controlling printing of the message server 200 of FIG. 16 may be executed in the message server 200 having the configuration of FIG. 3, for example, and may be executed in a message server 200 having any other configuration.

The above-described method for controlling printing of the message server 200 may be realized by at least one execution program to execute the above-described method for controlling printing of the message server 200, and the execution program may be stored in a computer readable medium.

Accordingly, each of the blocks of the present disclosure may be embodied as a compute recordable code on a computer readable medium. The computer readable recording medium may be a device that can store data readable by a computer system.

The foregoing embodiments and advantages are merely exemplary and are not to be construed as limiting the present inventive concept. Embodiments may be readily applied to other types of apparatuses. Also, the description of embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An electronic apparatus, comprising:
    a user interface to receive a command to execute a messenger program, to display a list of one or more dialogue partners, to receive an input of a command to select a dialogue partner from the list, to display information on options available for controlling another electronic apparatus on a first region of a graphical user interface (GUI) window of the messenger program, and to receive an input of a text command corresponding to one of the options to control the another electronic apparatus on a second region of the GUI window of the messenger program, the another electronic apparatus corresponding to the selected dialogue partner; and
    a controller to control the user interface to display the inputted text command on the first region of the GUI window of the messenger program, to transmit a dialogue message including the inputted text command to a message server, and in response to a dialogue message including state information of the another electronic apparatus being received from the message server, to control the user interface to display the received state information of the another electronic apparatus on the first region of the GUI window of the messenger program.

2. The electronic apparatus as claimed in claim 1, wherein the user interface receives the input of the text command to control the another electronic apparatus as a message on the second region of the GUI window of the messenger program.

3. The electronic apparatus as claimed in claim 1, wherein the controller, in response to the command to execute the messenger program being received through the user interface, drives the messenger program,
    wherein the GUI window of the messenger program is displayed by driving the messenger program.

4. The electronic apparatus as claimed in claim 1, wherein the state information includes information on an operation state of the another electronic apparatus.

5. The electronic apparatus as claimed in claim 4, wherein the user interface displays the options along with a respective abbreviated command corresponding to each of the options, and receives input of the text command as the abbreviated command on the second region of the GUI window of the messenger program.

6. The electronic apparatus as claimed in claim 1,
    wherein the user interface receives input of information on a user account, and
    wherein the controller transmits the inputted information on the user account to the message server, in response to information on other electronic apparatuses corresponding to the user account being received from the message server, to control the user interface to display information regarding the other electronic apparatuses, and in response to at least one electronic apparatus from among the displayed other electronic apparatuses being selected, to control the user interface to display a GUI window of the messenger program where the selected at least one electronic apparatus is the dialogue partner.

7. The electronic apparatus as claimed in claim 1, wherein the another electronic apparatus comprises an image forming apparatus,
    wherein the user interface receives selection of a file to be printed in the image forming apparatus, and
    wherein the controller transmits a dialogue message including the selected file to the message server.

8. The electronic apparatus as claimed in claim 1,
    wherein the user interface receives input of account information of the another electronic apparatus, and
    wherein the controller controls the user interface to display a dialogue partner corresponding to the account information of the another electronic apparatus.

9. A method for controlling an electronic apparatus, the method comprising:
    receiving a command to execute a messenger program;
    displaying a list of one or more dialogue partners;
    receiving an input of a command to select a dialogue partner from the list;
    displaying information on options available for controlling another electronic apparatus on a first region of a graphical user interface (GUI) window of the messenger program;
    receiving an input of a text command corresponding to one of the options to control the another electronic apparatus on a second region of the GUI window of the messenger program, the another electronic apparatus corresponding to the selected dialogue partner;
    displaying the inputted text command on the first region of the GUI window of the messenger program;
    transmitting a dialogue message including the inputted text command to a message server; and
    in response to a dialogue message including state information of the another electronic apparatus being received from the message server, displaying the received state information of the another electronic apparatus on the first region of the GUI window of the messenger program.

10. The method as claimed in claim 9, wherein receiving input of a text command comprises receiving input of a text command to control the another electronic apparatus as a message on the second region of the GUI window of the messenger program.

11. The electronic apparatus as claimed in claim 9, further comprising:
    in response to the command to execute the messenger program being received, driving the messenger program,
    wherein the GUI window of the messenger program is displayed by driving the messenger program.

12. The method as claimed in claim 9, wherein the state information includes information on an operation state of the another electronic apparatus.

13. The method as claimed in claim 12, wherein the displaying the received state information comprises displaying the options along with a respective abbreviated command corresponding to each of the options, and
wherein the receiving input of a text command comprises receiving input of the text command as the abbreviated command on the second region of the GUI window of the messenger program.

14. The method as claimed in claim 9, further comprising:
receiving input of information on a user account;
transmitting the inputted information on the user account to the message server;
in response to information on other electronic apparatuses corresponding to the user account being received from the message server, displaying information regarding the other electronic apparatuses; and
in response to at least one electronic apparatus from among the displayed the other electronic apparatuses being selected, displaying a GUI window of the messenger program where the selected at least one electronic apparatus is a dialogue partner.

15. The method as claimed in claim 9, further comprising:
receiving selection of a file to be printed in an image forming apparatus; and
transmitting a dialogue message including the selected file to the message server,
wherein the another electronic apparatus comprises the image forming apparatus.

16. The method as claimed in claim 9, further comprising:
receiving input of account information of the another electronic apparatus; and
displaying a dialogue partner corresponding to the account information of the another electronic apparatus.

17. At least one non-transitory computer readable medium comprising a program to execute a method for controlling an electronic apparatus, the method comprising:
receiving a command to execute a messenger program;
displaying a list of one or more dialogue partners;
receiving an input of a command to select a dialogue partner from the list;
displaying information on options available for controlling another electronic apparatus on a first region of a graphical user interface (GUI) window of the messenger program;
receiving an input of a text command corresponding to one of the options to control the another electronic apparatus on a second region of the GUI window of the messenger program, the another electronic apparatus corresponding to the selected dialogue partner;
displaying the inputted text command on the first region of the GUI window of the messenger program;
transmitting a dialogue message including the inputted text command to a message server; and
in response to a dialogue message including state information of the another electronic apparatus being received from the message server, displaying the received state information of the another electronic apparatus on the first region of the GUI window of the messenger program.

18. A system comprising:
an electronic apparatus to receive a command to execute a messenger program, to display a list of one or more dialogue partners, to receive an input of a command to select a dialogue partner from the list, to display information on options available for controlling another electronic apparatus on a first region of a graphical user interface (GUI) window of the messenger program, to receive an input of a text command corresponding to one of the options to control the another electronic apparatus on a second region of the GUI window of the messenger program, to display the inputted text command on the first region of the GUI window of the messenger program, and to transmit a dialogue message including the text command to a message server, the another electronic apparatus corresponding to the selected dialogue partner; and
the message server to receive the dialogue message from the electronic apparatus, to transmit the text command to the another electronic apparatus based on the received dialogue message, to obtain state information of the another electronic apparatus, and to transmit a dialogue message including the state information to the electronic apparatus,
wherein the electronic apparatus displays the state information in response to the dialogue message including the state information being received from the message server on the first region of the GUI window of the messenger program.

19. An electronic apparatus, comprising:
a user interface to receive a command to execute a messenger program, to display a list of one or more dialogue partners, to receive an input of a command to select a dialogue partner from the list, to display information on options available for controlling another electronic apparatus on a first region of a graphical user interface (GUI) window of the messenger program, and to receive a text command corresponding to one of the options to control the another electronic apparatus on a second region of the GUI window of the messenger program where the another electronic apparatus is the selected dialogue partner; and
a controller to control the user interface to display the inputted text command on the first region of the GUI window of the messenger program, to transmit a dialogue message including the inputted text command, and in response to a dialogue message including state information of the another electronic apparatus being received, to control the user interface to display the received state information of the another electronic apparatus on the first region of the GUI window of the messenger program.

* * * * *